No. 747,440. PATENTED DEC. 22, 1903.
J. M. W. KITCHEN.
COMBUSTION REGULATING ATTACHMENT.
APPLICATION FILED DEC. 18, 1901.
NO MODEL. 2 SHEETS—SHEET 1.
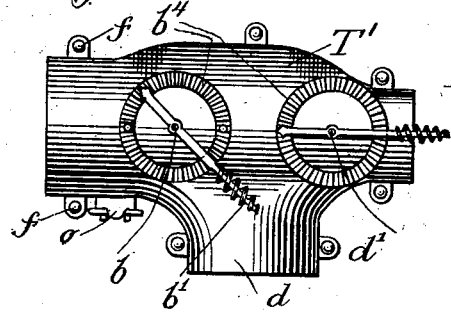
Fig. 1,
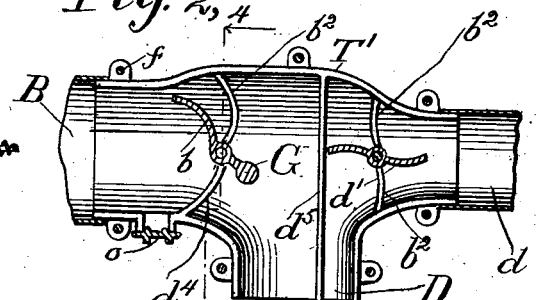
Fig. 2,
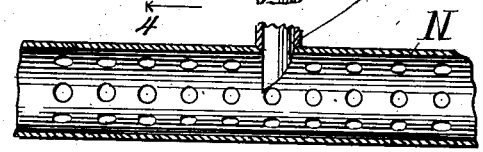
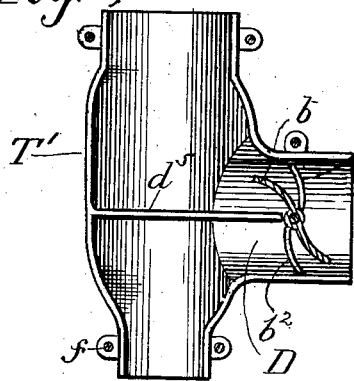
Fig. 5,
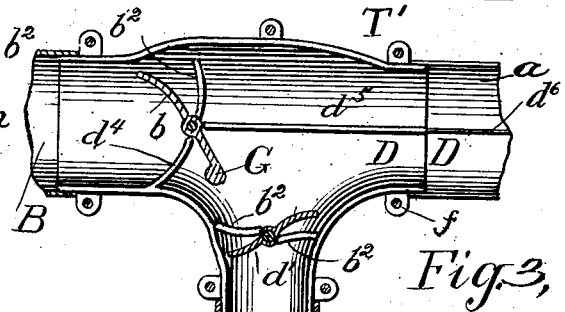
Fig. 3,
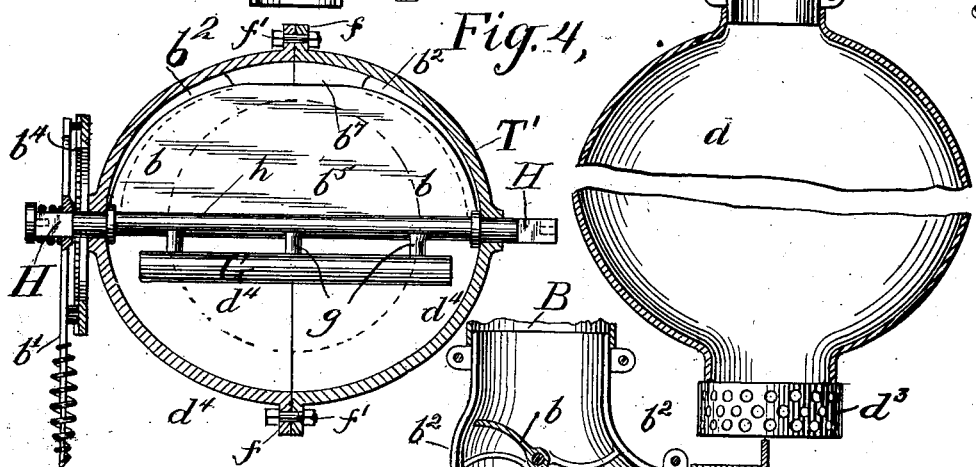
Fig. 4,
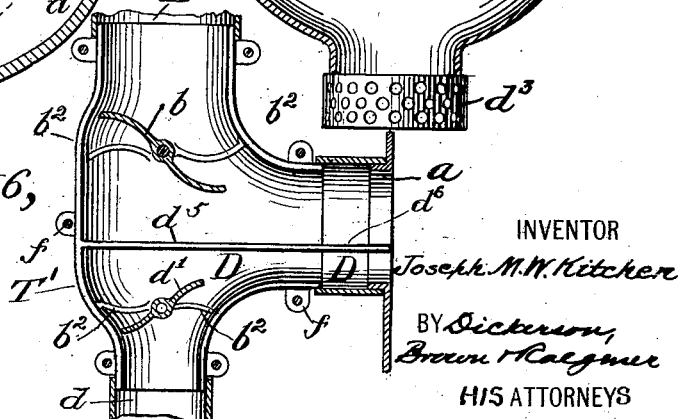
Fig. 6,
WITNESSES:
INVENTOR
Joseph M. W. Kitchen
BY Dickerson,
Brown & Raegener
HIS ATTORNEYS

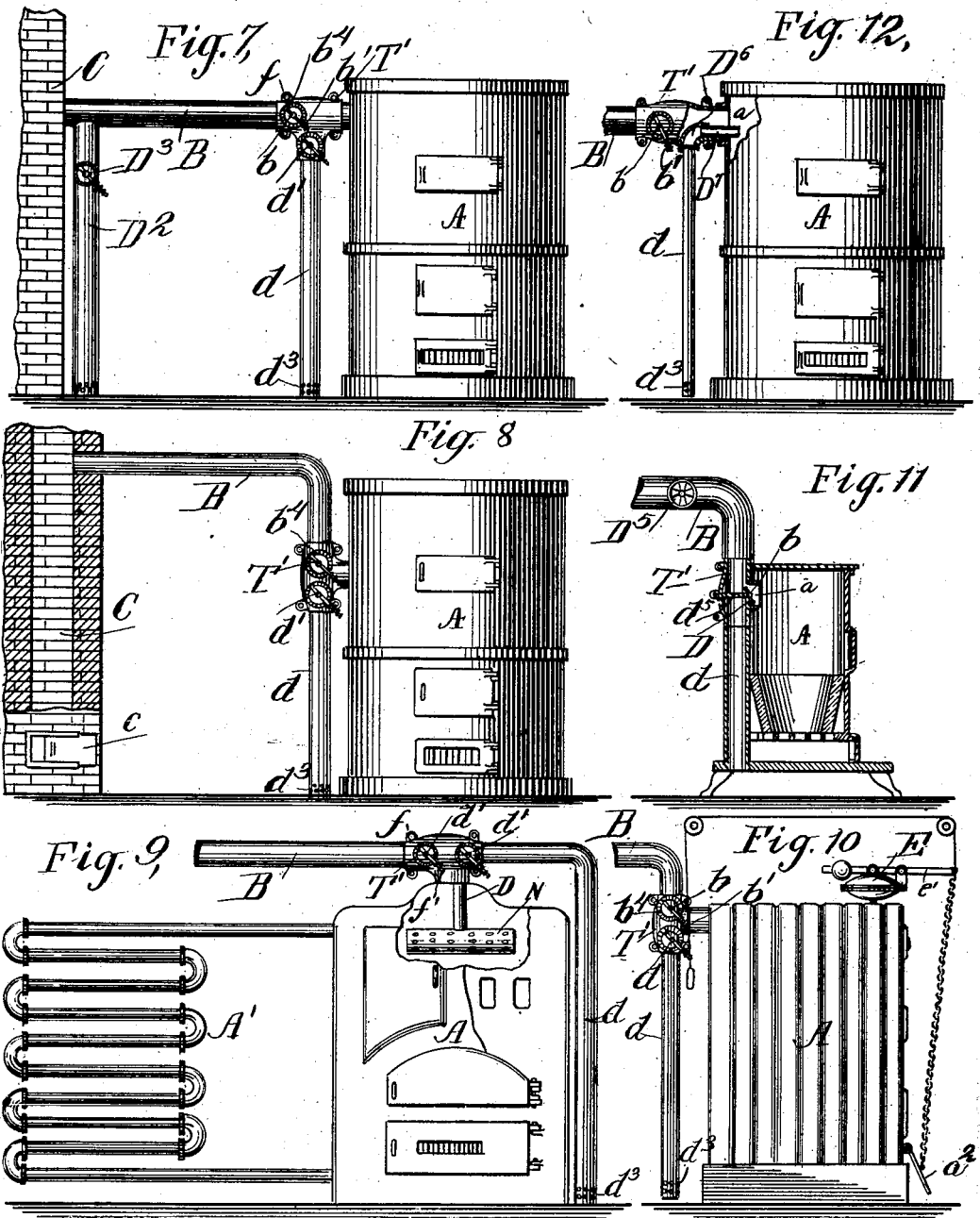

No. 747,440. Patented December 22, 1903.

UNITED STATES PATENT OFFICE.

JOSEPH M. W. KITCHEN, OF EAST ORANGE, NEW JERSEY.

COMBUSTION-REGULATING ATTACHMENT.

SPECIFICATION forming part of Letters Patent No. 747,440, dated December 22, 1903.

Application filed December 18, 1901. Serial No. 86,366. (No model.)

*To all whom it may concern:*

Be it known that I, JOSEPH M. W. KITCHEN, a citizen of the United States, residing in East Orange, in the county of Essex and State of New Jersey, have invented certain new and useful Improvements in Combustion-Regulating Attachments, of which the following is is a specification.

My invention relates to heating and power-producing apparatus, and is an attachment applicable to such apparatus and which provides for the regulation of the combustion process.

I will describe a device embodying my invention, together with several modifications thereof, and show its application to several forms of heating apparatus and then point out the novel features thereof in the claims.

In the accompanying drawings, Figure 1 is a view in side elevation of a device embodying my invention. Fig. 2 is a vertical longitudinal interior view of the device shown in Fig. 1 with the addition of an air-distributer, which is also in vertical longitudinal section and which may conveniently be used in connection therewith. Fig. 3 is a vertical longitudinal interior view of a modified form of device having applied thereto a reservoir which is in vertical section. Fig. 4 is a transverse sectional view taken on the line 4 4 of Fig. 2 and drawn to a larger scale than Fig. 2. Fig. 5 is a vertical longitudinal interior view showing another modified form of device. Fig. 6 is a vertical longitudinal interior view of another modified form of device. Fig. 7 is a view in elevation of a heating apparatus having applied to it the form of device shown in Fig. 3, but without the same form of reservoir. Fig. 8 is a view in elevation of a heating apparatus having applied to it the form of device shown in Fig. 6. Fig. 9 is a view in elevation and partly in vertical transverse section of a heating apparatus having applied to it the form of device shown in Fig. 1 and the air-distributer shown in Fig. 2. Fig. 10 is another form of a heating apparatus having applied to it the form of device shown in Fig. 6. Fig. 11 is a view, partly in vertical section, of another form of heating apparatus having applied to it a form of device similar to that shown in Fig. 5. Fig. 12 is a view of a heating apparatus having applied to it another form of device, which latter is shown partly in vertical section.

Similar letters of reference designate corresponding parts.

My device may be manufactured by casting. Some parts may be cast integral, while other parts are separately cast and then placed in position relatively to other parts.

My device resembles a T-coupling, in that it has three branches.

In the drawings the device as an entirety is designated by the reference character T. In practice the device is generally introduced in a smoke-flue B of a heating apparatus A and as close to the upper levels of the combustion-chamber of the heating apparatus as possible. This is done to get as quick and free introduction of air for combustion into the higher parts of the combustion-chamber as is possible. The device has a passage for air for combustion and a separate passage for the products of combustion leaving the combustion-chamber.

The T comprises a casing made in a plurality of sections. For convenience I make the casing in two sections. The casing is of the substantially bulbous form and is compressed at right angles to the flow of the products of combustion, as is shown in the accompanying drawings, in order to secure economy of material in the construction of the casing and to secure larger space internally and to facilitate a smooth and quick flow of gases through it by avoiding angles and by preventing sudden expansion of gases therein due to irregularity of form. Each section is provided with lugs $f$, and bolts $f'$ (see Fig. 4) are passed through opposing lugs on adjacent sections. Instead of bolts rivets may be used. Integral with each section are projections or ridges $b^2$, which serve as stops to prevent dampers comprised in the device being turned in undesired directions and to prevent leakage of gas about the periphery of the dampers. Also integral with each section are projections $d^4$ of such shape that when two such projections abut, as shown in Fig. 4, a partition-wall will be formed, which closes the lower part of the passage in which they are formed. The purpose of this partition-wall is to prevent downdrafts passing the damper toward the combustion-chamber and also to keep apart the air for combustion and the products of combustion and to prevent the air for combustion flowing toward the chimney. The stops $b$ and partitions $d^4$ will be adjacent the dampers comprised in the device. Also integral with each section is a projection of considerable length, which is so arranged as to separate or divide the space of its section into two parts. When two such projections abut, a partition-diaphragm $d^5$ is formed which divides the interior space of the casing into two parts to form two separate passages, one for air for combustion and the other for products of combustion. In some forms of the device (see Figs. 5, 6, and 11) the partition-diaphragm $d^5$ alone effects the division to form the two passages, while in the form shown in Fig. 3 the partition-wall $d^4$ assists in the division. The partition-diaphragm $d^5$ is preferably of such length as to project through the exit-opening $a$ of the heating apparatus for the products of combustion. In case in the disposition of the device in the smoke-flue the partition-diaphragm $d^5$ is not sufficiently long for this purpose an extension $d^6$, (see Figs. 3 and 6,) having connection with the diaphragm $d^5$, may be employed.

In all forms of my invention means are provided for controlling the passage of gases through the two passages. I have shown such means as consisting of dampers.

$b$ represents the damper for controlling the passage for products of combustion, and $d'$ the damper for controlling the passage for air for combustion. In some forms of my invention (see Figs. 2, 3, and 4) the damper $b$ is shown as consisting of a single blade, to which a counterbalance G is connected by spokes $g$, which construction allows gas to flow between the counterbalance-weight and the shaft of the damper. In other forms of my invention I employ a two-blade damper, either of which blades serves as a counterbalance for the other. The counterbalance assists in retaining the damper in fixed position. In weighting any blade of the damper used in my invention provision is made to also counterbalance the damper-handles, so that the fixing in position of the damper may be more effectually secured. It will be seen from the drawings that the damper-blades are curved. The purpose of curving the blades is to facilitate a quicker passage of the air and gas over the surface of the blades and through the two passages. The upper part of the blade of the damper $b$ has a portion of its periphery cut away to allow of the continuous passage of a small current of the products of combustion.

Each damper $b$ $d'$ is mounted to swing on a pintle or shaft $h$, mounted in suitable bearings in the casing of the device, and on either end H of each pintle a handle $b'$ of any desired construction may be secured in any desired manner.

$b^4$ represents an indicating-dial having a ratchet-surface with which a handle $b'$ coacts. The dial $b^4$ is separately formed and secured in any desired manner to the casing of the device.

Whenever a joint is formed in the assembling of the parts which are stationary, it is closed by cement or other desired means.

$o$ represents a cap or plug which may be removed for cleaning purposes.

In Fig. 7 the device is applied to a horizontally-arranged smoke-flue B. As has been stated, the form of device for this smoke-flue is the same as shown in Fig. 3. To secure the best results with the use of my invention in its application to a heating apparatus, I provide a dependent conduit or reservoir $d$, which is so secured to the device as to be continuous with the passage for air for combustion. This dependent conduit is pervious at its lower end, as indicated at $d^3$. The shape of the dependent conduit may be varied as found desirable. It may consist merely of a cylindrical vertical tube, as shown in Figs. 7 to 12, inclusive, or it may be of a bulbous form, as shown in Fig. 3, or it may be sinuous to conform to obstacles to its ordinary disposition. The functions of the dependent conduit are that of a passage for air for combustion and as a reservoir for overflow products of combustion from the combustion-chamber of a heating apparatus. The dependent conduit also provides a means for the products of combustion to act as a cut-off for air for combustion by their entrance therein and to return, through atmospheric pressure acting upwardly in the dependent conduit, any gaseous products of combustion that may be in the upper portion of the said conduit. I have also shown as a chimney check-draft a second dependent conduit $D^2$, which is located between the dependent conduit $d$ and a chimney C. The dependent conduit $D^2$ is provided with a damper $D^3$ and is pervious at its lower end.

Instead of a dependent conduit $D^2$ the flue of the chimney may be continued below the smoke-flue B, as shown in Fig. 8, and a damper C may be provided at the bottom of the flue in the chimney C. In Fig. 8 the form of device introduced in the smoke-flue is that illustrated in Fig. 6, and the form of dependent conduit is the same as that shown in Fig. 7; but, if desired, the form of dependent conduit shown in Fig. 3 may be used.

Instead of the form of conduit in Fig. 3 other forms of dependent conduits may be used. I wish it understood that in any application of my invention any form of dependent conduit may be used which will answer the purposes intended for the dependent conduit and which have been previously described herein.

In Fig. 9 the form of device shown in Figs. 1 and 2 is applied to a horizontal smoke-flue B. The dependent conduit $d$ in this application is provided with a bend at its upper end in order that it may be conveniently connected with the device T' to have its passage continuous with the passage D in the device. In this form of heating apparatus an air-distributer N may be conveniently employed. This distributer is suitably connected with the device T'. As here shown, the distributer consists of a horizontally-arranged cylinder the wall of which is perforated. It may be of any convenient size and shape and be carried to any part of the combustion-chamber for the purpose of conveying the air for combustion and to distribute the same more widely and quickly than if the air were only allowed to mix with the combustible gases through diffusive force.

In Fig. 10 the form of device introduced in the smoke-flue B is the same as shown in Fig. 6. The heating apparatus A is here shown as being provided with a pressure-regulator E, which through suitable connections may operate either of the dampers $b$ $d'$ of the device, as well as the ash-pit-door damper $a^2$.

In Fig. 11 the form of device providing a single controlling-damper applied to the heating apparatus is substantially like that shown in Fig. 5, the difference being that the device is integral with the heating apparatus. The dependent conduit $d$ is also shown as being integral with the heating apparatus. In this form also I have shown a check-draft $D^5$ applied directly in the smoke-flue B.

In Fig. 12 I have shown a modification of the device T' as shown in Fig. 5 applied to a horizontally-disposed smoke-flue. In this case the damper $b$ controls the smoke-passage cast in the device T', while the curved air-inlet $D^6$ is of sufficient size to pass through it a small amount of air for combustion into a short conduit $D^7$, which is connected with the curved passage $D^6$, into the inlet of which passage is screwed the pipe $d$, having an internal caliber equal to that of the air-inlet passage $D^6$, and which pipe, together with the inlet-passage and short conduit, conveys to the combustion-chamber the small amount of air described. By having this passage, as well as the dependent conduit $d$, of a certain fixed diameter a simple and convenient equivalent is provided for certain cases where a dependent conduit of larger capacity provided with a controlling-damper is necessary, as in cases where a large amount of air for combustion is required.

Certain features of the invention herein shown and described, but not herein claimed, form the subject-matter of and are broadly claimed in my applications, Serial No. 47,492, filed February 15, 1901, and Serial No. 86,365, filed December 18, 1901, although the species shown, described, and claimed herein is not shown in said applications. These features include combinations of means for introducing air for combustion into the gas-retaining upper levels of the combustion-chamber at about where the waste products of combustion find their exit. Said means comprise a vertically-disposed air-conduit, deflecting-dampers, other deflecting-surfaces, partitions for keeping separate outside of the combustion-chamber the air for the combustion and waste gaseous products of combustion, and for controlling the rate of passage of the gaseous products from the combustion-chamber, and for regulating the amount of air introduced at a high level in the combustion-chamber, and prescribing the level from which air is received for introduction, and for separately controlling the chimney-draft, acting through the combustion-chamber, and for indicating the position of and for keeping in position the controlling means.

What I claim as my invention, and desire to secure by Letters Patent, is—

1. As an article of manufacture a T-shaped device for use in connection with the combustion-chamber of a heating apparatus and with the smoke-flue of said apparatus, said T being fusiform or bulbous in shape, capable of being cast in sections, having lugs or other fastenings integral therewith for holding such sections together when assembled, providing three circular branch connections of which the two larger are for connection with a smoke-flue and with the exit-orifice of the said combustion-chamber and of which the smaller is for connection with a dependent air-conduit, said T having therein separate passages for air for combustion and for smoke and gaseous products of combustion, and means for controlling said passages and for deflecting air for combustion to a combustion-chamber and for facilitating a quick flow of gases through said T.

2. As an article of manufacture a T-shaped device for attachment to the orifice for the exit of gaseous products of combustion from a combustion-chamber and with a smoke-flue of a heating apparatus, the said T having a fusiform or bulbous-shaped casing providing in its central internal parts a diameter greater than that of any of its external openings and providing for a smooth and quick flow of gases therethrough, said T being formed in sections capable of being cast and having provisions for holding together the assembled parts, providing for three connections, having a passage for air for combustion and a passage for smoke and gas, having dampers for controlling separately said passages, and having means for deflecting a vertically-moving column of air to a combustion-chamber.

3. As an article of manufacture, a T-shaped device for use in connection with the combustion-chamber and smoke-flue of a heating apparatus, said T being fusiform or of bulbous shape, made in sections capable of being cast, having provisions for holding in position the assembled sections, providing for three connections, having a passage for air for combustion and a passage for the exit of gaseous products of combustion therethrough, having dampers for separately controlling said passages, and having means for deflecting and directing and quickening the flow of a current of air for combustion to a combustion-chamber, and provided with stops closely adjacent said dampers cast integral with the casing of said T for preventing the dampers being turned in undesired directions and to prevent peripheral leakage around the dampers.

4. As an article of manufacture, a T-shaped device for connection with a combustion-chamber and a smoke-flue, providing separately connections for said chamber, for said flue and for a dependent air-conduit, said T having a fusiform bulbous-shaped sectional casing providing for the free smooth flow of gases through said T by reason of the provisions of large internal space and fusiform surface curvatures due to the form of said casing, having a passage for air for combustion and a passage for products of combustion, providing dampers for separately controlling said passages, and having a partition-wall closely adjacent the damper controlling the passage for products of combustion, said wall preventing drafts between said passages and serving for the direction of air for combustion to a combustion-chamber.

5. As an article of manufacture, a T-shaped device for introduction between a combustion-chamber and a smoke-flue, providing for three connections, having a passage for air for combustion and a passage for gaseous products of combustion, having dampers for controlling separately said passages, and one of said dampers having a counterbalance so disposed as to provide for the passage of gases between said counterbalance and the shaft of the damper to which it is attached.

6. As an article of manufacture, a T-shaped device providing for three connections, having a fusiform or bulbous-shaped casing capable of being cast in sections, having provisions for holding the assembled sections together by the use of bolts or other fastenings, having separately a passage for air for combustion and a passage for products of combustion, said device being provided with dampers having blades so disposed as to control each of said passages and in connection with said casing to help by deflection, a quick smooth flow of gases through said device.

7. As an article of manufacture, a three-branched T-shaped device for use in connection with a combustion-chamber and a smoke-flue, comprising a fusiform bulbous-shaped sectional casing and means for holding together said casing, a partition-diaphragm for forming two passages in said T, one for air for combustion, and one for gaseous products of combustion, means for controlling said passages, and means for indicating the position of and holding in fixed positions said controlling means.

8. In combination with a combustion-chamber, a chimney, a smoke-flue, a dependent conduit for air for combustion, a three-branched T device having a fusiform bulbous-shaped casing capable of being cast in sections and providing through such shape for a smooth and quick flow of gases therethrough and having a passage for conveying air for combustion to a combustion-chamber and a passage providing for the exit therethrough of gaseous products of combustion toward said chimney, means for controlling the flow of gases through said passages, and means external to said casing for indicating the position of and retaining in said position said controlling means, said external means comprising a dial having a ratchet-surface and a handle and pointer coacting with said dial.

9. As an article of manufacture and in combination with the smoke-flue of a heating or power-producing apparatus and with a means for introducing air for combustion into the internal parts of a combustion-chamber and securing a quick distribution and admixture of said air with volatilized gases in said combustion-chamber, a T-shaped device having a fusiform bulbous-shaped casing and providing means for the passage of air for combustion and for gaseous products of combustion therethrough in separate currents, means for regulating the quantity of air and said products passing therethrough, said T-shaped device being independent of the means for the distribution of air in said combustion-chamber but providing for a connection therewith, said T having means for deflecting said air for combustion to said combustion-chamber, said T being provided with means for connecting the same with the smoke-flue, with the said combustion-chamber and with a dependent air-conduit, said device being adapted for the best carrying out of its special functions when located closely adjacent said combustion-chamber.

10. As an article of manufacture adapted for use in combination with the combustion-chamber and smoke-flue of a heating apparatus and with a dependent conduit, a T-shaped device comprising a bulbous or fusiform casing capable of being cast in sections, three branches for suitable connections including provision for being located closely adjacent to the higher levels of the cavities of said combustion-chamber, means for the passage of air for combustion and for products of combustion therethrough in two separate passages, means for the connection of the air-passage with said dependent conduit, said conduit being of sufficient length to prevent gaseous products of combustion from being emitted from its lower end, means for the deflection of air for combustion into the higher levels of the cavities of said combustion-chamber, means for regulating the amount of air for combustion passing through said device, means for holding in position and for indicating the position of said regulating means, and means for holding back in the upper levels of said apparatus the volatilized products of combustion and the introduced air for combustion and for controlling the amount of air introduced and for adjusting the amount of air introduced in proper proportion to varying intensity of draft conditions acting through said apparatus.

In testimony whereof I have signed my name to this specification in the presence of two subscribing witnesses.

JOSEPH M. W. KITCHEN.

Witnesses:
GEO. E. CRUSE,
JOS. P. MCELDUFF.